March 11, 1958  O. A. CLARK ET AL  2,826,342
FLUID METERING MECHANISM
Filed May 31, 1955  2 Sheets-Sheet 1
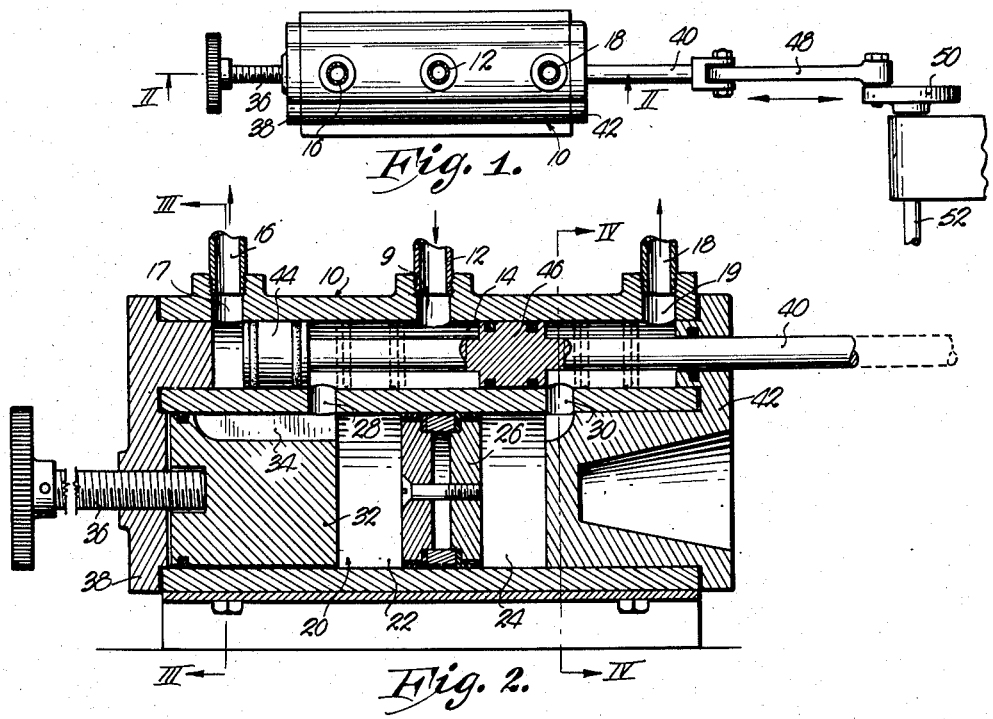
Fig. 1.
Fig. 2.
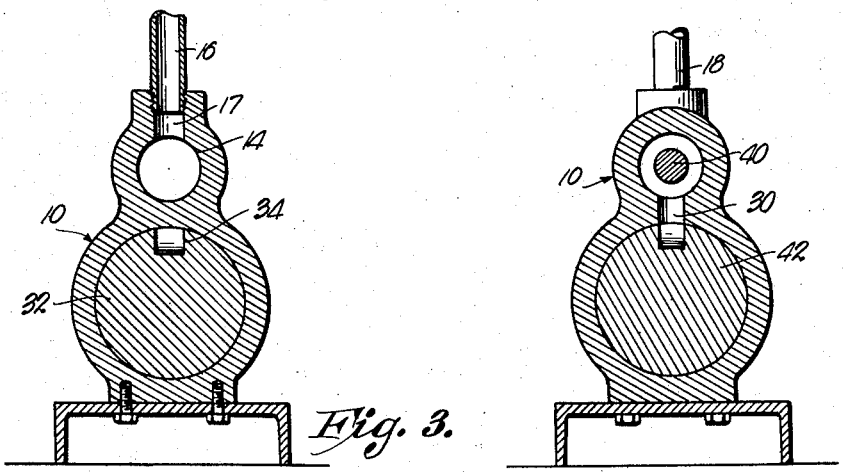
Fig. 3.
Fig. 4.
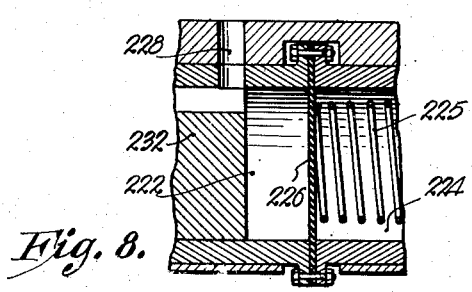
Fig. 8.
Otho A. Clark
David A. Clark
Ocie D. Hughes
INVENTORS.
BY
ATTORNEY

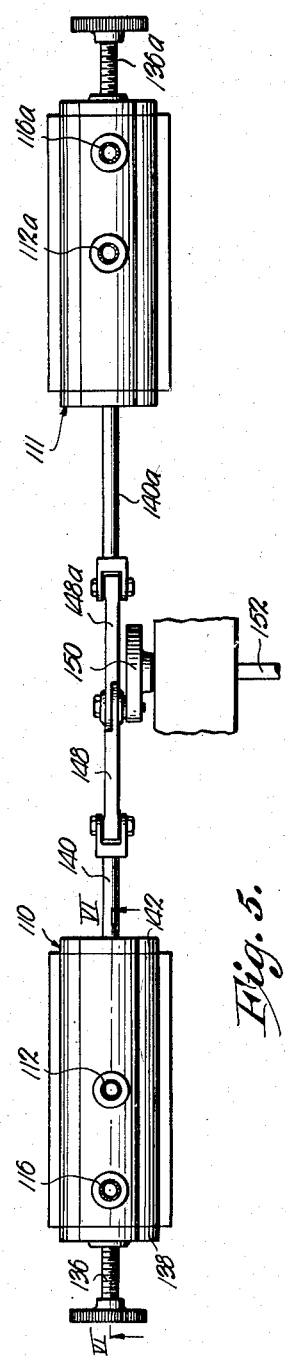

United States Patent Office 2,826,342
Patented Mar. 11, 1958

2,826,342

FLUID METERING MECHANISM

Otho A. Clark, David A. Clark, and Ocie D. Hughes, Atherton, Mo., assignors to Clark Manufacturing Company, Atherton, Mo., a partnership Application May 31, 1955, Serial No. 512,127

2 Claims. (Cl. 222—177)

This invention has to do with apparatus for controlling the flow of fluids, particularly those that are pressurized and therefore, directed to the control device under pressure, the primary object being to provide a control that is particularly adapted for use in the application of chemical fertilizers to the soil.

It is common practice today to apply anhydrous ammonia and other pressurized fertilizing fluids through utilization of a furrow forming knife having a fertilizer discharge tube associated therewith and disposed to introduce the fluid into the furrow as the same is formed and immediately prior to closing of the furrow, thereby trapping the fertilizer therewithin. The equipment employed for such purpose normally includes a supply tank carried by the dispenser, together with some type of control for releasing the fluid at a predetermined rate as the equipment is moved across a field by a tractor.

The most common flow control means being used today consists simply of a regulator, pre-set and usually adjustable to permit escape of the fluid from the storage tank to the soil at a preselected rate. Such control is, of course, satisfactory only if the ground speed of the tractor remains substantially constant.

In order to improve upon such systems there has been developed a control that is dependent upon the ground speed of the tractor usually working from the wheels of the tractor or the fertilizing equipment. Such improved systems are in the nature of so-called pumps having a piston which is reciprocated in accordance with the speed of rotation of a ground wheel.

It is the most important object of the present invention therefore, to improve upon conventional fluid—control means of the aforementioned character by providing a piston controlled by the pressure of the fluid itself, rather than by the speed of rotation of a ground wheel, there being a valving arrangement actuated through an operable connection with a ground wheel for controlling the flow of fluid to and from the piston in accordance with the speed of rotation of such wheel.

Another important object of this invention is to provide a control as just above set forth having, in addition to the fluid-control piston and the wheel-controlled valving, novel means to permit adjustment of the amount of fluid discharged by each stroke of the piston and including an adjustable displacement which determines the capacity of the cylinder within which the reciprocable piston operates.

Another object of the instant invention is the provision of a fluid-control device or metering mechanism having a pair of cylinders, one for the valving mechanism, the other receiving the reciprocable piston presenting a pair of opposed chambers for receiving the fluid, the capacity of the piston chamber being variable by adjustment of a plug reciprocable therein and at one end of the piston cylinder.

A still further object of this invention is to provide a metering mechanism wherein the valving is operable to control the flow of pressurized fluid first into one chamber on one side of the piston and then into the other chamber on the opposite side of the piston, whereby the pressure of the fluid drives the piston and thereby forces the fluid from the control to the discharge tubes of the equipment.

A further object of this invention is to provide a modified form of metering mechanism embodying a pair of opposed co-acting units, each having a spring-loaded piston for forcing the fluid into the soil when the individual valving means thereof are disposed to block the flow of fluid from the storage container to the cylinder that contains the piston.

Other objects include important details of construction to be made clear as the following specification progresses, reference being had to the accompanying drawings, wherein:

Figure 1 is a plan view of fluid metering mechanism made pursuant to one form of our present invention.

Fig. 2 is an enlarged, vertical, cross-sectional view taken on line II—II of Fig. 1.

Fig. 3 is a transverse, cross-sectional view taken on line III—III of Fig. 2.

Fig. 4 is a transverse, cross-sectional view taken on line IV—IV of Fig. 2.

Fig. 5 is a plan view of a modified form of fluid metering mechanism made in accordance with the principles of the present invention.

Fig. 6 is an enlarged, vertical, cross-sectional view taken on line VI—VI of Fig. 5.

Fig. 7 is a transverse, cross-sectional view taken on irregular line VII—VII of Fig. 6; and Fig. 8 is a fragmentary view similar to Fig. 6 showing another embodiment of the present invention.

As above indicated, the fluid to be controlled through use of the metering mechanism of the instant invention is normally under pressure and the pressurized container therefor may be coupled with inlet 9 of a hollow body 10 through an inlet pipe 12 communicating with a valve chamber or cylinder 14 formed in the body 10, as best seen in Fig. 2.

The fluid, such as anhydrous ammonia or other fertilizer, escapes from the cylinder 14 alternately from outlet tubes 16 and 18 communicating with the cylinder 14 by outlets 17 and 19 and leading to a point of discharge or use. In this connection, since the metering mechanism shown in the embodiment of Figs. 1 to 4 inclusive is especially adapted for use in the application of fertilizer, it may be pointed out that tubes 16 and 18 may couple with a suitable manifold (not shown) from which emanates a plurality of pipes, each terminating within a furrow formed by a soil-penetrating blade comprising a part of the equipment.

The body 10 is also provided with a second chamber or cylinder 20 subdivided into a pair of opposed compartments 22 and 24 by a movable member in the nature of a floating piston 26, freely reciprocable within the cylinder 20 longitudinally thereof. Compartments 22 and 24 are placed into communication with the cylinder 14 by passages 28 and 30 respectively.

Variable displacement is provided through utilization of means to alter the capacity of the cylinder 20 and taking the form of a plug 32 reciprocable in the cylinder 20 longitudinally thereof. Plug 32 has a groove 34 therein whereby the compartment 22 is always in communication with the passage 28 regardless of the adjusted position of plug 32. Such adjustment is accomplished by manipulation of a screw 36 threaded in end wall 38 of the body 10 and bearing against the proximal end of the plug 32.

The valving means chosen for illustration of the principles of the instant invention includes a stem 40 reciprocable in end wall 42 of the body 10, longitudinally of the cylinder 14. A pair of spaced valves 44 and 46 are mounted on the stem 40 within cylinder 14.

The valving means may be reciprocated in any suitable manner and for purposes of illustration, there is shown a crank 48 in Fig. 1 of the drawings pivotally connected to the outermost end of the stem 40, as well as to a rotatable disc 50 eccentrically of the latter. Disc 50 may be mounted on a shaft 52 and when the metering mechanism of Figs. 1 to 4 inclusive is used in connection with fertilizing equipment as above indicated, the shaft 52 may be operably connected with a ground wheel in any suitable manner. In this connection it is desired that the valving means be operated in accordance with the ground speed of the fertilizing equipment and, therefore, as the speed of rotation of the tractor wheel or a wheel of the fertilizer equipment with which the shaft 52 is connected, varies, the speed of reciprocation of stem 40 will also vary. In other words, uneven terrain over which the fertilizing equipment is advanced, as well as the nature of the soil being worked, and many other factors, will determine the ground speed and therefore, the speed of rotation of the ground-engaging wheel and the shaft 52 with which it is connected.

In operation, when the valves 44 and 46 are in the position shown by full lines in Fig. 2 of the drawings, it is manifest that the pressurized fluid emanating from the container therefor, will enter the cylinder 14 by way of pipe 12 and inlet 9, and thereupon pass into the compartment 22 of cylinder 20 by way of passage 28. Such pressure of the incoming fluid into the compartment 22 will force the piston 26 toward the end wall 42 of body 10, it being noted that valve 46 blocks the flow of fluid from inlet 9 to the compartment 24 because of the position of valve 46 between inlet 9 and passage 30. Similarly, the valve 44 being positioned between the inlet 9 and the outlet 17, no fluid can flow from the inlet 9 to the outlet tube 16.

When the stem 40 and, therefore, the valves 44 and 46, move to the dotted line position shown in Fig. 2 of the drawings, valve 46, being disposed between passage 30 and outlet 19, blocks the flow of fluid to the outlet tube 18 but permits the pressurized fluid to enter the compartment 24 on the opposite side of piston 26 by way of tube 12, inlet 9, cylinder 14 and passage 30.

The valve 44 on the other hand now blocks the flow of fluid from inlet 9 to the compartment 22, by way of inlet 28 and since valve 44, in the dotted line position, is disposed between inlet 9 and passage 28, the fluid previously introduced into the compartment 22, is free to flow to the outlet tube 16 by way of passage 28, cylinder 14 and outlet 17.

The fluid flows to the tube 16 under the impulse of the pressure exerted thereon by piston 26. In other words, the incoming fluid entering the compartment 24 between piston 26 and end wall 42, forces the piston 26 toward the plug 32 and thereby displaces the fluid within compartment 22 through passage 28, cylinder 14, outlet 17 and tube 16.

It is now clear that, since the stem 40 and therefore, the valves 44 and 46 reciprocate constantly during rotation of the ground wheel with which shaft 52 is connected, the fertilizer is discharged alternately from tubes 16 and 18 at a rate depending upon the speed of rotation of shaft 52. By the same token, the amount of fluid that is discharged during each stroke of the valves 44 and 46 is determined by the capacity of the cylinder 20. Accordingly, if the amount of discharge during each stroke is to be varied, it is but necessary to manipulate the screw 36 and thereby change the position of plug 32 within cylinder 20. If the screw 36 is moved inwardly to in turn move the plug 32 toward the end wall 42, the capacity of the cylinder 20 is lessened and a lesser amount of fluid is permitted to flow into compartment 22 or 24 as the case may be, depending upon the positions of the valves 44 and 46.

From the foregoing it now becomes apparent that the metering mechanism of the embodiment shown in Figs. 1 to 4 inclusive utilizes the pressure inherent in the fluid being controlled to reciprocate the piston 26 and that the ground speed of the equipment is utilized only to control the valving mechanism.

The principles of the instant invention may also be applied to a slightly modified embodiment in the nature of that illustrated by Figs. 5 to 7 inclusive, wherein is provided a pair of bodies 110 and 111. The two hollow bodies 110 and 111 are shown separate and spaced-apart in Fig. 5 of the drawings, but it is manifest that manufacturing expedients may make it preferable to combine the two hollow bodies 110 and 111 in a single unit therefor, the arrangement of Fig. 5 shall be understood to be chosen for illustrative purposes only.

Inasmuch as the bodies 110 and 111 are identical, but one will be described and the same includes a pair of chambers or cylinders 114 and 120, the latter being subdivided into a pair of opposed compartments 122 and 124, one on each side respectively of a movable member or piston 126 reciprocable in the cylinder 120 longitudinally of the latter.

Compartment 122 of cylinder 120 is placed into communication with the cylinder 114 by a passage 128 and variable displacement plug 132 within the cylinder 120 has a clearance slot 134 for the passage 128 as in the embodiment previously described. Plug 132 may be adjusted in any suitable manner such as by a screw 136 in wall 138 which closes one end of the body 110, whereas wall 142 closes the opposite end thereof. A spring 125 within the chamber 124 and interposed between wall 142 and piston 126 yieldably holds the latter biased toward the plug 132.

The valving mechanism includes a reciprocable stem 140 having a valve 144 thereon within the cylinder 114. A pipe 112 communicating with an inlet 109 for the cylinder 114 leads from a suitable source of pressurized fluid not shown. The fluid is discharged to a point of use or application by a tube 116 communicating with an outlet 117 for the cylinder 114.

The two stems 140 and 140a for the two units 110 and 111 respectively, may be operably coupled with a ground-engaging wheel in any suitable manner for reciprocation thereby and for purposes of illustration, there is shown in Fig. 5 a disc 150 eccentrically receiving a pair of cranks 148 and 148a pivotally connected to stems 140 and 140a respectively. Shaft 152 of disc 150 may be operably connected with the rotating ground-engaging wheel in any suitable manner not shown.

When the valve 144 is disposed as shown by full lines in Fig. 6 between outlet 117 and passage 128 of cylinder 14, the corresponding valve for unit 111 is disposed between inlet 112a and the passage of unit 111 corresponding to passage 128 shown in Fig. 6. Such position of the valve in unit 111 corresponding to valve 144 may be understood by noting the dotted line position of valve 144 shown in Fig. 6.

When valve 144 is so positioned as shown in full lines in Fig. 6, fluid is free to flow to the compartment 122 by way of pipe 112, inlet 109, cylinder 114 and passage 128, thereby forcing the piston 126 toward the end wall 142 against the action of spring 125. During such flow of the fluid into the compartment 122, the piston of unit 111 is disposed to block the flow of fluid into the piston cylinder of unit 111 by way of inlet pipe 112a.

When the valves reverse their positions, valve 144, being disposed between inlet 109 and passage 128, blocks further flow of fluid into the compartment 122 and releases the fluid in compartment 122 for flow to the tube 116 by way of passage 128, cylinder 114, and outlet 117. Such outward flow of the fluid to a point of use of application is induced by the pressure of piston 126 thereon moving toward the plug 132 under influence of spring 125 previously compressed by the incoming fluid as aforementioned. While the fluid is being applied to a manifold or the like by way of outlet tube 116, fluid is flowing into the unit 111 through inlet pipe 112a. Conversely, when fluid is flowing into the compartment 122, it is being exhausted from the unit 111 by way of outlet tube 116a. Manifestly, the unit 111 is provided with adjustable displacement means in the same manner as shown in Fig. 6 which is controlled manually by screw 136a.

It is seen that the embodiment of Figs. 5 to 7 inclusive operates similarly to the modification shown by Figs. 1 to 4 inclusive with respect to the valving means being controlled by a ground-engaging wheel and the piston being shifted in one direction by the incoming fluid. In the embodiment of Figs. 5 to 7 inclusive however, the piston 126 is moved to a position forcing the fluid out of the compartment 122 by the action of spring 125 rather than by the force of incoming fluid as in the embodiment of Figs. 1 to 4 inclusive.

In either form of the invention the rate of application of the fertilizer is dependent with great accuracy upon the ground speed of the equipment and in each form of the invention the amount of fluid discharged during each stroke of the piston, may be easily and quickly altered by variance in the position of the adjustable displacement means.

In Fig. 8, the movable member within the chamber or cylinder takes the form of a flexible diaphragm 226 dividing the cylinder into a pair of compartments 222 and 224. And, if desired, a spring 225 may be employed in compartment 224 to normally bias or flex the diaphragm 226 toward adjustable plug 232.

Fluid entering passage 228 will flex diaphragm 226 against the action of spring 225 as the compartment 222 is filled in the same manner as above described with respect to Fig. 6. Upon operation of the valve (not shown) to cut off incoming fluid and permit escape of fluid from compartment 222, diaphragm 226, and spring 225 if used, will force such fluid out of compartment 222 to a point of use.

While the amount of fluid ejected by each stroke of diaphragm 226 may be less than in the forms previously described, nevertheless, the operation of the embodiment of Fig. 8 is faster and may, therefore, be desirable in some instances.

Having thus described the invention what is claimed as new and desired to be secured by Letters Patent is:

1. In apparatus for applying a pressurized fertilizing fluid to the soil and adapted to be carried by a wheeled vehicle, fluid metering mechanism including a pair of opposed units, each having a hollow body provided with a pair of elongated chambers, an inlet and an outlet communicating with one of the chambers, and a passage interconnecting the chambers, a pipe registering with said inlet and adapted for connection with a source of said fluid, a piston reciprocable in the other chamber between the passage and one end of the body, a spring in said other chamber between the piston and said one end of the body for yieldably biasing the piston toward the passage, and a valve reciprocable in said one chamber to each side respectively of the passage between said inlet and said outlet and having a stem extending outwardly beyond the body; and means interconnecting the stems and adapted for operable connection with a wheel of said vehicle for reciprocating the valves, said one valve being disposed between its corresponding inlet and passage when the stems are at one end of their paths of travel and between its corresponding outlet and passage when the stems are at the opposite end of their paths of travel, the other valve being disposed between its corresponding outlet and passage when the stems are at said one end of their paths of travel and between its corresponding inlet and passage when the stems are at said opposite ends of their paths of travel.

2. The invention as set forth in claim 1, said means including a rotatable shaft having a disc rigidly mounted thereon, and a crank pivotally connecting each stem respectively with the disc, the connection between the cranks and the disc being eccentric to the axis of rotation of the latter.

References Cited in the file of this patent

UNITED STATES PATENTS

| | | |
|---|---|---|
| 1,454,765 | Patterson et al. | May 8, 1923 |
| 2,352,490 | Meyers | June 27, 1944 |
| 2,475,686 | Anderson | July 12, 1949 |